(12) United States Patent
Christoffersson et al.

(10) Patent No.: US 11,259,330 B2
(45) Date of Patent: Feb. 22, 2022

(54) COMMUNICATIONS DEVICE AND METHODS THEREIN FOR TRANSMISSION OF A MESSAGE IN RESPONSE TO A RANDOM ACCESS RESPONSE COMPRISING MULTIPLE GRANTS

(71) Applicant: Telefonaktiebolaget LM Ericsson (publ), Stockholm (SE)

(72) Inventors: Jan Christoffersson, Luleå (SE); Mats Folke, Vällingby (SE); Min Wang, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/485,292

(22) PCT Filed: Mar. 15, 2018

(86) PCT No.: PCT/SE2018/050253
§ 371 (c)(1),
(2) Date: Aug. 12, 2019

(87) PCT Pub. No.: WO2018/203786
PCT Pub. Date: Nov. 8, 2018

(65) Prior Publication Data
US 2020/0059968 A1    Feb. 20, 2020

Related U.S. Application Data

(60) Provisional application No. 62/501,138, filed on May 4, 2017.

(51) Int. Cl.
*H04W 72/14*    (2009.01)
*H04W 74/08*    (2009.01)
(Continued)

(52) U.S. Cl.
CPC ....... *H04W 74/0833* (2013.01); *H04W 72/14* (2013.01); *H04W 76/27* (2018.02); *H04B 7/0413* (2013.01)

(58) Field of Classification Search
CPC ............. H04W 72/1268; H04W 72/14; H04W 74/0833; H04W 76/27; H04B 7/0413
See application file for complete search history.

(56) References Cited

U.S. PATENT DOCUMENTS 9,144,079 B1    9/2015    Marupaduga et al.
2011/0176500 A1    7/2011    Wager et al.
(Continued)

FOREIGN PATENT DOCUMENTS

WO    2013167748 A1    11/2013
WO    2017052445 A1    3/2017

OTHER PUBLICATIONS

Considerations on RA procedure in NR, 3GPP TSG-RAN WG2 #97bis; R2-1703570; Spokane, USA, Apr. 3-7, 2017, pp. 1-2 (Year :2017).*
(Continued)

*Primary Examiner* — Melvin C Marcelo
*Assistant Examiner* — Natali Pascual Peguero
(74) *Attorney, Agent, or Firm* — Sage Patent Group

(57) ABSTRACT

A method performed by a communications device 208 for transmitting a message in response to a Random Access Response (RAR) message received from a Radio Network Node (RNN) 206. The RAR message comprises multiple grants. When the message to be transmitted requires resources provided by any one grant out of the multiple grants, the communications device selects one grant out of the multiple grants. When the message to be transmitted requires resources provided by two or more grants out of the multiple grants, the communications device selects the two
(Continued)

or more of the grants out of the multiple grants. When the message to be transmitted requires more resources than provided by the multiple grants, the communications device selects one grant out of the multiple grants. The communications device transmits, to the RNN, the message using resources provided by the selected at least one grant out of the multiple grants.

15 Claims, 5 Drawing Sheets

(51) Int. Cl.
*H04W 76/27* (2018.01)
*H04B 7/0413* (2017.01)

(56) References Cited

U.S. PATENT DOCUMENTS

| | | |
|---|---|---|
| 2012/0044905 A1 | 2/2012 | Kim |
| 2012/0163311 A1 | 6/2012 | Park |
| 2015/0139175 A1* | 5/2015 | Ratasuk ............... H04L 5/0007 370/330 |
| 2015/0282213 A1* | 10/2015 | Sun ................... H04W 74/0833 370/329 |
| 2017/0374686 A1 | 12/2017 | Agarwal et al. |

OTHER PUBLICATIONS

"Combined AS/NAS for control plane activation", 3GPP TSG-RAN WG2 #66; R2-092956; San Francisco, USA, May 4-8, 2009, pp. 1-3.
"Random access procedure in NR", 3GPP TSG-RAN WG2 Meeting #96, Reno, Nevada, U.S., Nov. 14-18, 2016, pp. 1-5.
"Considerations on RA procedure in NR", 3GPP TSG-RAN WG2 #97bis; R2-1703570; Spokane, USA, Apr. 3-7, 2017, pp. 1-2.
"Issues on multiple grants", 3GPP TSG-RAN WG2 #99; R2-1708913; Berlin, Germany, Jun. 21-25, 2017, pp. 1-3.
"LCP for multiple grants", 3GPP TSG RAN WG2 #99; R2-1707740; Berlin, Germany, Aug. 21-25, 2017, pp. 1-3.
"3GPP TS 36.321"; 3rd Generation Partnership Project; Technical Specification Group Radio Access Network; Evolved Universal Terrestrial Radio Access (E-UTRA); Medium Access Control (MAC) protocol specification (Release 15) V15.1.0, Mar. 2018, pp. 1-109.
First Examination Report dated Nov. 25, 2020 for Indian Patent Application No. 201917032015, 7 pages.

* cited by examiner

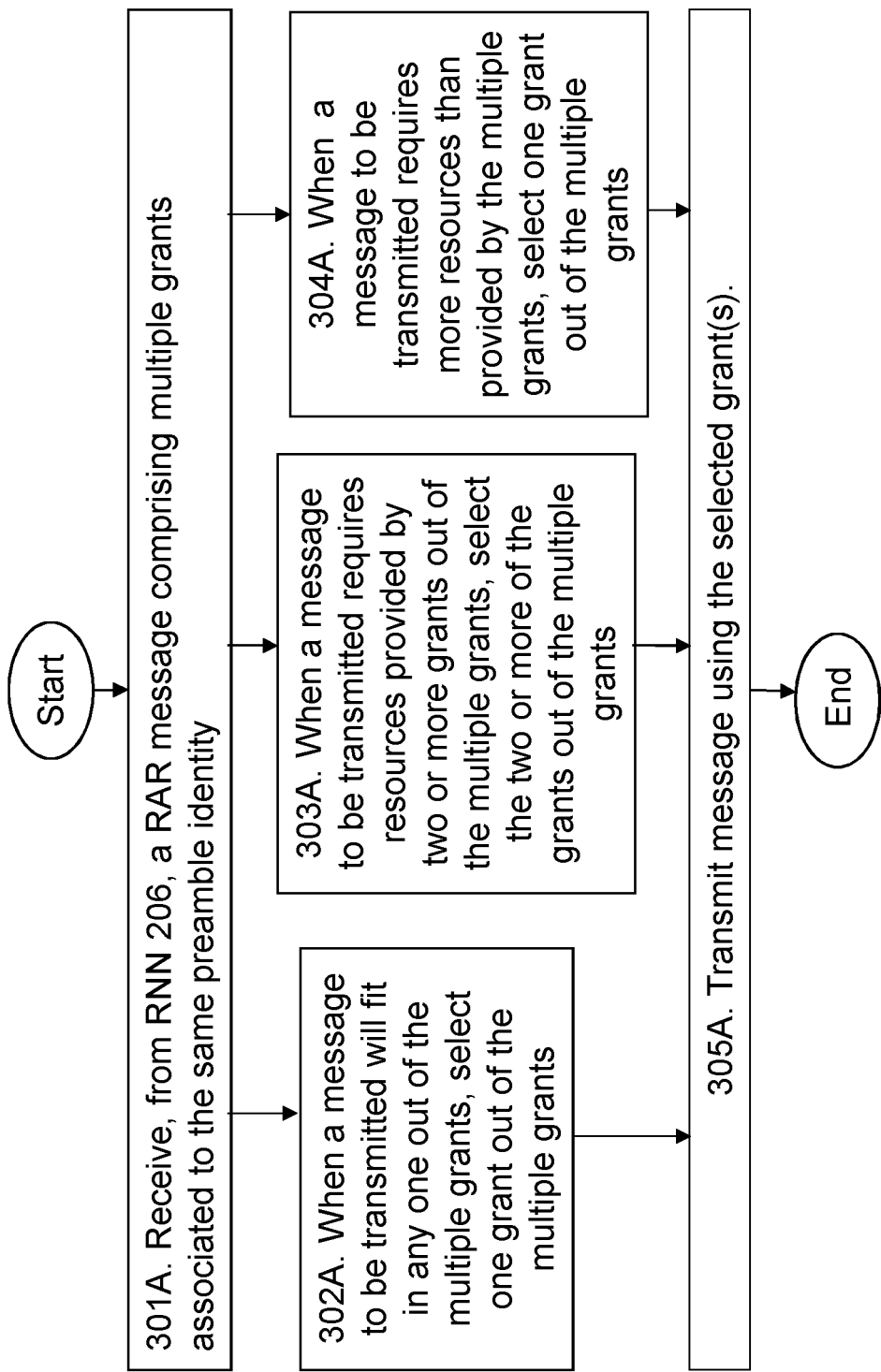
Figure 3A Method performed by communications device 208

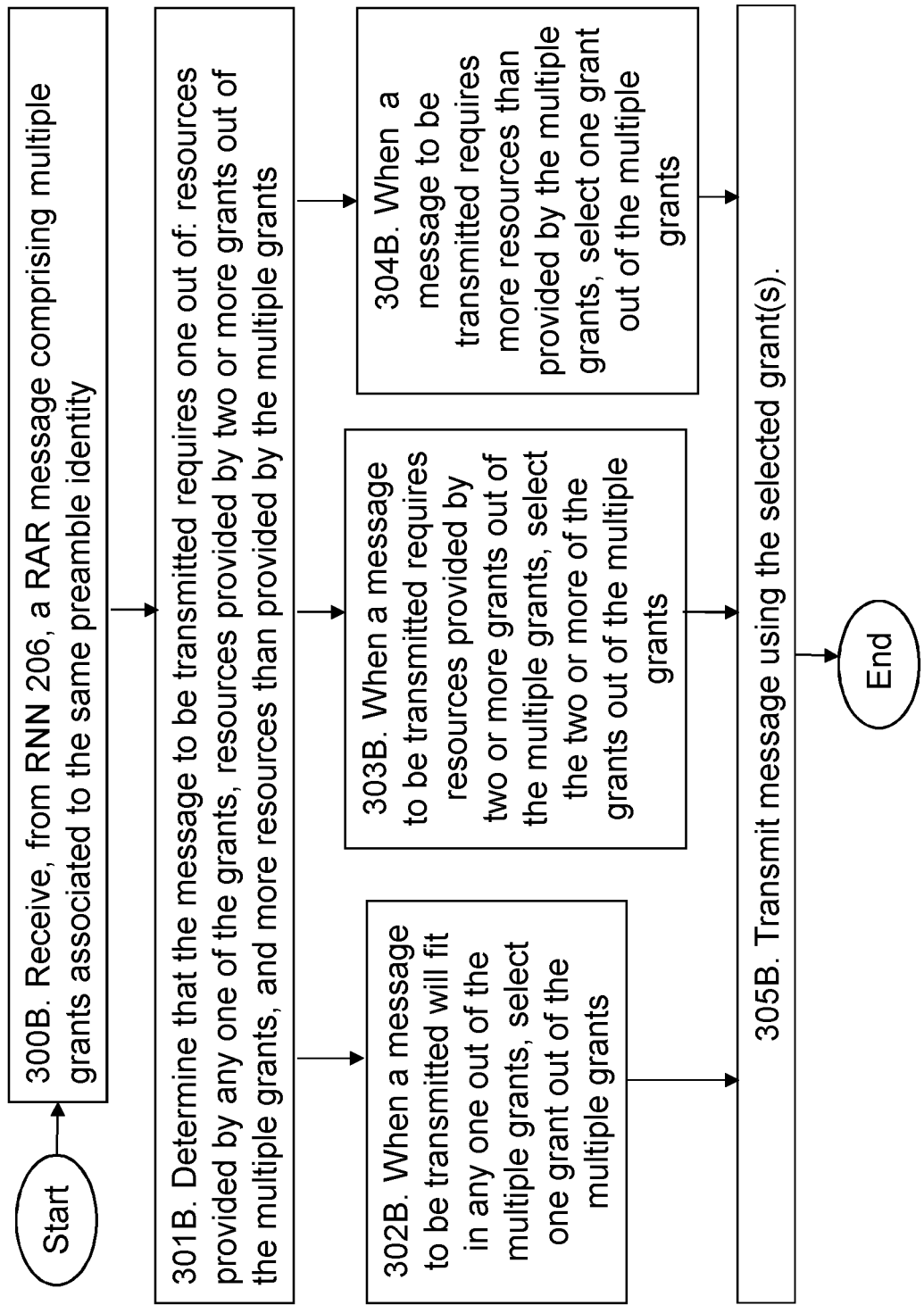
Figure 3B Method performed by communications device 208

COMMUNICATIONS DEVICE AND METHODS THEREIN FOR TRANSMISSION OF A MESSAGE IN RESPONSE TO A RANDOM ACCESS RESPONSE COMPRISING MULTIPLE GRANTS

TECHNICAL FIELD

Embodiments herein relate to a communications device, and to methods therein. Especially, embodiments herein relate to transmission of a message in response to a Random Access Response (RAR).

BACKGROUND

Communication devices such as terminals or wireless devices are also known as e.g. User Equipments (UEs), mobile terminals, wireless terminals and/or mobile stations. Such terminals are enabled to communicate wirelessly in a wireless communication system or a cellular communications network, sometimes also referred to as a cellular radio system or cellular networks. The communication may be performed e.g. between two wireless devices, between a wireless device and a regular telephone and/or between a wireless device and a server via a Radio Access Network (RAN) and possibly one or more core networks, comprised within the wireless communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area being served by an access node such as a base station, e.g. a Radio Base Station (RBS), which sometimes may be referred to as e.g. an "eNB", an "eNodeB", a "NodeB", a B node", or a Base Transceiver Station (BTS), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used for the transmission path from the base station to the mobile station. The expression Uplink (UL) is used for the transmission path in the opposite direction i.e. from the mobile station to the base station.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipment. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a Radio Network Controller (RNC) or a Base Station Controller (BSC), which supervises and coordinates various activities of the plural radio network nodes connected thereto. This type of connection is sometimes referred to as a backhaul connection. The RNCs and BSCs are typically connected to one or more core networks.

Specifications for the Evolved Packet System (EPS), also called a Fourth Generation (4G) network, have been completed within the 3GPP and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

In the 3GPP LTE, base stations, which may be referred to as eNodeBs or even eNBs, may be directly connected to one or more core networks.

The 3GPP LTE radio access standard has been written in order to support high bitrates and low latency both for uplink and downlink traffic. All data transmission is in LTE controlled by the radio base station.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO systems.

Random Access in LTE

In modern cellular radio systems, e.g. wireless communications systems or networks, the radio network has a strict control on the behavior of the terminal. Uplink transmission parameters like frequency, timing, and power are regulated via downlink control signaling from the base station to the terminal, e.g. the UE. For instance, by time-aligning the uplink (UL) transmissions, orthogonality between UEs may be achieved in the time domain, and this is necessary since the radio resources are scarce.

At power-on or after a long standby time, the UE, e.g. the terminal, is not synchronized in the uplink. The UE may derive an uplink frequency and power estimate from downlink (control) signals. However, a timing estimate is difficult to make since the round-trip propagation delay between the eNodeB, e.g. the base station, and the UE is unknown. So even if the UE uplink timing is synchronized to the downlink, it may arrive too late at the eNodeB receiver because of propagation delays. Therefore, before commencing transmitting traffic, the UE has to carry out a Random Access (RA) procedure to the network. After RA, the eNodeB can estimate the timing misalignment of the UE uplink and send a correction message.

Usually, a Physical Random Access Channel (PRACH) is provided for the UE to request access to the network. A RA preamble is used which is based on a specific sequence with good auto-correlation. Because multiple UEs may request access at the same time, collisions may occur between requesting UEs. Therefore, a contention resolution scheme has to be implemented to separate the UE transmissions. To distinguish between different UEs performing RA, typically many different preambles exist. A UE performing RA randomly picks a preamble out of a pool of preambles and transmits it. The preamble represents a random UE identity (ID) which may be used by the eNodeB when granting the UE access to the network. The eNodeB receiver may resolve RA attempts performed with different preambles and send a response message to each UE using the corresponding random UE IDs. In case multiple UEs simultaneously use the same preamble a collision occurs and most likely the RA attempts are not successful since the eNodeB cannot distinguish between the two users, e.g. UEs, with the same random UE ID.

To minimize the probability of collision, the set of available sequences should be large.

FIG. 1 schematically illustrates an example of a Random Access procedure in LTE as specified in the 3GPP documents 36.321 sections 5.1 and 6.

Action 101. The UE transmits a RA preamble to the eNodeB (eNB). The eNodeB receiver listens at all RA opportunities to detect preambles. In case a preamble is successfully detected, a RA Response (RAR) that comprises, e.g., the number of the detected preamble, timing advance information and an UL grant for an UL transmission (e.g., Msg3 in step 3 of the RA procedure), is sent in a special message on the downlink (DL) from the eNodeB to the UE. This is illustrated in Action 102. The UL grant comprised in a RA response is henceforth sometimes referred to as RA response grant or just referred to as a grant. The UL grant comprises information about one or more resources available for the UE for the UL transmission.

A UE that has recently performed a RA preamble transmission is listening within a certain time window after the preamble has been sent to receive a RA response. In case of a successful reception of the RA response, the UE continues with Action 103 of the RA procedure. In case no RA response is received by the UE within the specified time window, a new attempt is made, e.g. a new RA preamble is transmitted to the eNodeB, cf. Action 101.

Action 103. After receiving the RA Response in Action 102, the UE decodes the message and reads the enclosed RA Response grant. The UE then sends the RA message 3 (msg3) using this grant, i.e. the enclosed RA Response grant also referred to as the UL grant. In LTE, the timing of the grant is given by the standard and a flag inside the grant.

Action 104. In response to a received RA msg3, the eNodeB transmits an RA message 4 (msg4) to the UE providing RA contention resolution.

Action 105. Further transmissions may be transmitted between the UE and the eNodeB, e.g. uplink transmissions from the UE to the eNodeB and/or downlink transmissions from the eNodeB to the UE.

SUMMARY

An object addressed by embodiments herein is how to improve performance in a wireless communications network.

According to an aspect of embodiments herein, the object is achieved by a method performed by a communications device for transmitting a message in response to a Random Access Response (RAR) message received from a Radio Network Node (RNN). The message may be a msg 3 comprising possible data. The communications device and the RNN are operating in a wireless communications network.

The communications device receives, from the RNN, a RAR message comprising multiple grants associated to the same preamble identity (ID).

The communications device determines that the message to be transmitted requires one out of: resources provided by any one of the grants out of the multiple grants, resources provided by two or more grants out of the multiple grants, and more resources than provided by the multiple grants.

When the message to be transmitted will fit in any of the grants, e.g. when the message to be transmitted requires resources provided by any one of the multiple grants, the communications device selects, e.g. randomly selects, one grant out of the multiple grants.

When the message to be transmitted will fit in two or more grants out of the multiple grants, e.g. when the message to be transmitted requires resources provided by the two or more grants out of the multiple grants, the communications device selects the two or more of the grants out of the multiple grants.

When the message to be transmitted requires more resources than provided by the multiple grants, the communications device selects, e.g. randomly selects, one grant out of the multiple grants.

The communications device transmits, to the Radio Network Node, the message using resources provided by the selected at least one grant out of the multiple grants, i.e. using the selected one grant out of the multiple grants or using the selected two or more grants out of the multiple grants.

According to another aspect of embodiments herein, the object is achieved by a communications device for transmitting a message in response to a Random Access Response message received from a Radio Network Node (RNN). The message may be a msg 3 comprising possible data. The communications device and the RNN are configured to operate in a wireless communications network.

The communications device is configured to receive, from the RNN, a RAR message comprising multiple grants associated to the same preamble ID.

The communications device is configured to determine that the message to be transmitted requires one out of: resources provided by any one of the grants out of the multiple grants, resources provided by two or more grants out of the multiple grants, and more resources than provided by the multiple grants.

The communications device is configured to select, e.g. configured to randomly select, one grant out of the multiple grants when the message to be transmitted will fit in any of the grants, e.g. when the message to be transmitted requires resources provided by any one grant out of the multiple grants.

The communications device is configured to select two or more of the grants out of the multiple grants when the message to be transmitted will fit in the two or more grants out of the multiple grants, e.g. when the message to be transmitted requires resources provided by the two or more grants out of the multiple grants.

The communications device is configured to select, e.g. configured to randomly select, one grant out of the multiple grants when the message to be transmitted requires more resources than provided by the multiple grants.

The communications device is configured to transmit, to the RNN, the message using resources provided by the selected at least one grant out of the multiple grants, i.e. using the selected one grant out of the multiple grants or using the selected two or more grants out of the multiple grants.

According to another aspect of embodiments herein, the object is achieved by a computer program, comprising instructions which, when executed on at least one processor, causes the at least one processor to carry out the method performed by the communications device.

According to another aspect of embodiments herein, the object is achieved by a carrier comprising the computer program, wherein the carrier is one of an electronic signal, an optical signal, a radio signal or a computer readable storage medium.

An advantage with some embodiments disclosed herein is that they allow overprovisioning of grants in RAR for msg3 transmission to be used for other purpose than avoiding msg3 collisions. By the term "overprovisioning" when used in this disclosure is meant that the network, e.g. the wireless communications network, is able to assign more resources than the normal assigned resources, to a UE, so that the UE may have better potential to empty the buffer at a time. This feature is useful in case the system is lowly loaded, e.g. when UL resources are available.

BRIEF DESCRIPTION OF DRAWINGS

Examples of embodiments herein will be described in more detail with reference to attached drawings in which:

FIGS. 3A and 3B are flowcharts depicting embodiments of a method performed by a communications device.

DETAILED DESCRIPTION

Figure 1:
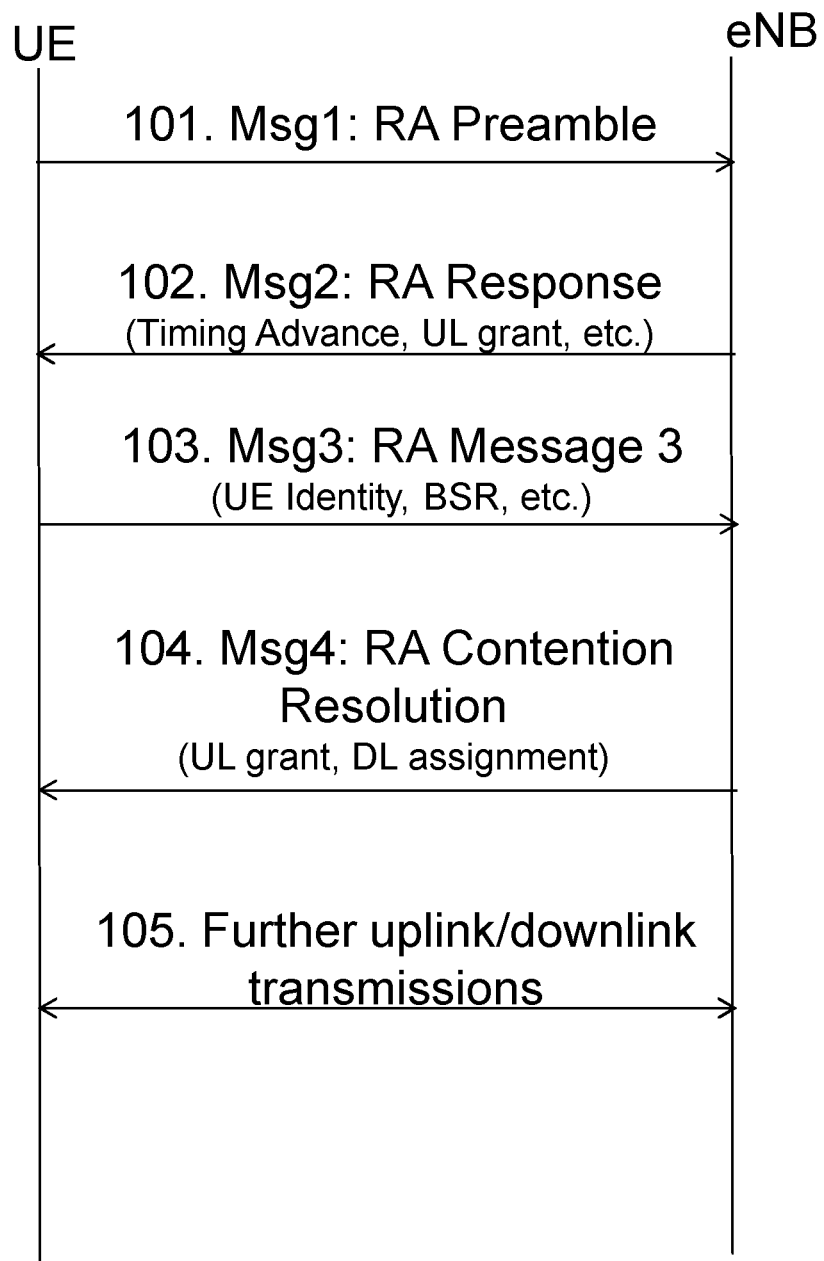
FIG. 1 schematically illustrates an example of a Random Access procedure in LTE according to prior art.

For a 5G communications network, also referred to as a New Radio (NR) communications network, the RAR may contain more than one grant to a specific preamble. This may be beneficial if two UEs select the same preamble and PRACH resource. When a gNB (the eNodeB in 5G) responds with the RAR with one grant to this preamble, both UEs will transmit a msg3 which will then collide since the two UEs will transmit the msg3 using the same resources provided by the one grant. In this case, the gNB will only detect one of the msg3 and the other UE will then have to retry the random access by retransmitting the preamble. Preamble collisions could be more common if small preamble groups are used to signal e.g. an msg3 size with high granularity because fewer preambles will be used within each group. By the expression "msg3 size with high granularity" when used herein is meant that the size of the message msg3 is indicated by selecting a preamble from a specific group of preambles, and the granularity is given by the number of groups where a high granularity means a high number of groups.

If the gNB is able to send several grants targeting each detected preamble, it has been proposed that the UE should randomly select a grant, e.g. randomly select one grant out of the several grants, to use for transmission of the msg3. A benefit of this procedure would be that the risk of msg3 collision would be reduced, since the likelihood of two UEs using the same grant is reduced if they randomly select one grant out of the several grants. If more than two grants are issued to a preamble, the collision probability would be reduced even further. Thus, the more grants that are issued per detected preamble, the lower collision probability. Actually, the preambles may collide as much as before but since different UEs have a chance of using different grants, the effect of the collisions is reduced and thus the collision probability is said to be reduced. The procedure of issuing more than one grant for msg3 transmission may be feasible in situations when Physical Uplink Shared Channel (PUSCH) resources are not exhausted. For example, this may be the case when there is little uplink traffic other than the UL transmissions caused by the Random Access.

Some embodiments disclosed herein provide to have different actions, e.g. UE actions, upon receiving multiple grants to a preamble used in a RAR message. Communications devices, e.g. UEs, that have a msg3 (and possibly small data) that will fit in any of the grants will randomly select one grant to use for its msg3 transmission. In case the UE is not able fit its msg3 (and possibly small data) in one grant, it will use more than one grant out of the grants to transmit its msg3 (and possibly small data). In case the msg3 (and possibly small data) will not fit in all (or a configured number of grants), will randomly select one (or a configurable number of) grant(s) for msg3 (and possibly small data) transmission.

Note that although terminology from LTE is used in this disclosure to exemplify the embodiments herein, this should not be seen as limiting the scope of the embodiments herein to only the aforementioned system. Other wireless systems, such as for example a NR network, 5G network, an LTE network, a Wideband Code Division Multiple Access (WCDMA) network, a Global System for Mobile Communications (GSM) network, any 3GPP cellular network, a Worldwide Interoperability for Microwave Access (WiMAX) network, a Wireless Local Area Network (WLAN), a Low Rate Wireless Personal Access Network (LR-WPAN) as defined in e.g. IEEE 802.15.4, a Bluetooth network, a SIGFOX network, a Zigbee network, a Bluetooth Low Energy (BLE) network such as a Bluetooth Smart network, or a Cellular Internet of Things (CIoT) network such as an Enhanced Coverage GSM-IoT (EC-GSM-IoT) network, a Narrow Band IoT (NB-IoT) network or a network comprising one or more wireless devices configured for Machine Type Communication (MTC) sometimes herein referred to as an eMTC network, may also benefit from exploiting the ideas covered within this disclosure.

Further, the description frequently refers to wireless transmissions in the uplink, but embodiments herein are equally applicable in the downlink.

In the following, embodiments herein are illustrated by exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

It should furthermore be noted that, to anyone skilled in the art, there are several realizations of the embodiments below with principally equivalent functionality.

In addition, it should be noted that message names, parameters, information elements and field names may change during the course of the specification work which implies that embodiments described herein still apply as long as the principal function and/or use is the same.

Some exemplifying embodiments will now be described in more detail.

Figure 2:
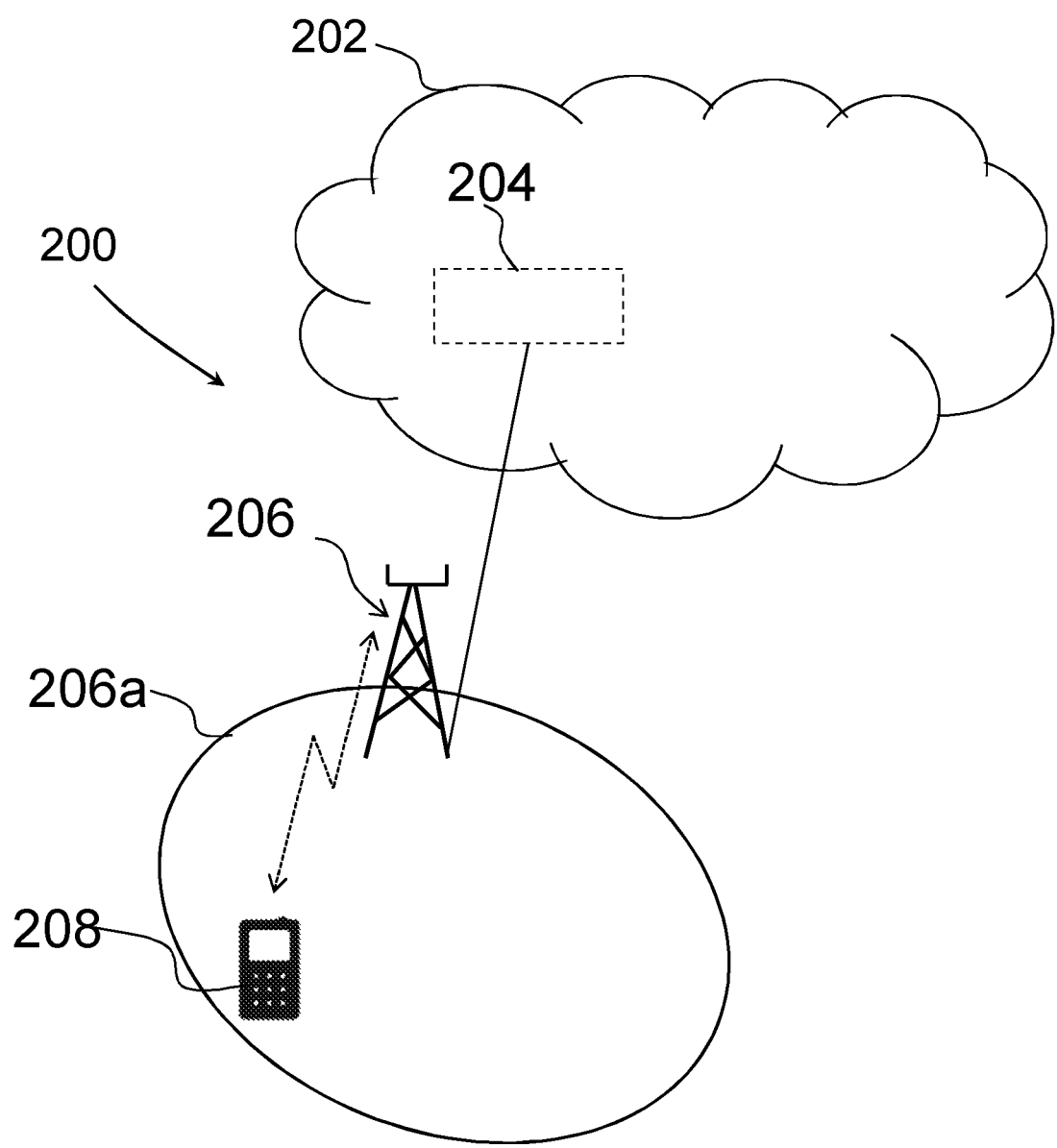
FIG. 2 schematically illustrates embodiments of a wireless communications network.

FIG. 2 depicts an example of the wireless communications network 200 in which embodiments herein may be implemented. The wireless communications network 200 may be a cellular communications network such as a NR network, a 5G network, an LTE network, a WCDMA network, a GSM network, any 3GPP cellular network, or a short range communications network, such as a WLAN, an LR-WPAN, a Bluetooth network, WiMAX network, a SIGFOX network, a Zigbee network, a BLE network such as a Bluetooth Smart network, or a CIoT network such as an EC-GSM-IoT network, a NB-IoT network or an eMTC network, or a combination of one or more of the aforementioned communications networks just to mention some examples.

A Core Network (CN) 202 may be comprised in the communications network 200 The core network 202 may be an NR core network, a 5G core network, an LTE core network, a WCDMA core network, a GSM core network, any 3GPP cellular core network, or a short range communications core network, such as a WLAN core network, an LR-WPAN core network, a Bluetooth core network, WiMAX core network, a SIGFOX core network, a Zigbee core network, a BLE core network such as a Bluetooth Smart network, or a CIoT core network such as an EC-GSM-IoT core network, a NB-IoT core network or an eMTC core network, or a combination of one or more of the aforementioned communications core networks just to mention some examples.

A Core Network Node (CNN) 204 may be comprised in or arranged in communication with the core network 202. The core network node 204 may be a Mobility Management Entity (MME) or a Serving GPRS Support Node (SGSN). The core network node is sometimes referred to as just a network node 204.

A Radio Network Node (RNN) 206 is arranged and configured to operate in the communication network 200. The RNN 206 is configured for wireless communication with communications devices, e.g. communications devices such as a communications device 208, when they are located within a coverage area 206a, e.g. a geographical area served by the RNN 206. It should be understood that the RNN 206 may serve or manage a plurality of coverage areas 206a, even though only one is illustrated in FIG. 2 for clarity reasons. The one more coverage areas 206a are sometimes in this disclosure referred to as one or more cells 206a.

The RNN 206 may be a transmission point such as a radio base station, for example a gNB, an E-UTRA node, a LTE eNB, an eNB, an Node B, or an Home Node B, an Home eNode B, a BTS or any other network node being capable to serve a communications device in a communications network, such as the communications network 200. The RNN 206 may further be configured to communicate with the core network node 204. The RNN 206 is sometimes referred to as just a network node 206.

A communications device 208 is operating in the wireless communications network 200. The communications device 208, also sometimes referred to as a wireless communications device, a wireless device, a User Equipment (UE), or a Mobile Station (MS), may be located in the wireless communications network 200. For example, the communications device 208 may be an Internet of Things (IoT) device, a user equipment, a mobile terminal or a wireless terminal, a mobile phone, a computer such as e.g. a laptop, a Personal Digital Assistants (PDAs) or a tablet computer, with wireless capability, or any other radio network units capable to communicate over a radio link in a wireless communications network. It should be noted that the term user equipment used in this document also covers other wireless devices such as Machine to Machine (M2M) devices, even though they are not handled by any user. In some embodiments, the communications device 208 is a stationary wireless device. Thus, the communications device 208 is sometimes in this disclosure referred to as a stationary communications device 208. By the expression "stationary wireless device" when used herein is meant that the communications device 208 is not moving. For example, the stationary communications device 208 is not moving when in use, e.g. during operation.

The communications device 208 is sometimes referred to as just a network node 208. Further, the RNN 206, the communications device 208, and the core network node 204, may be referred to as first, second and third network nodes 208, 206, 204.

Figure 4:
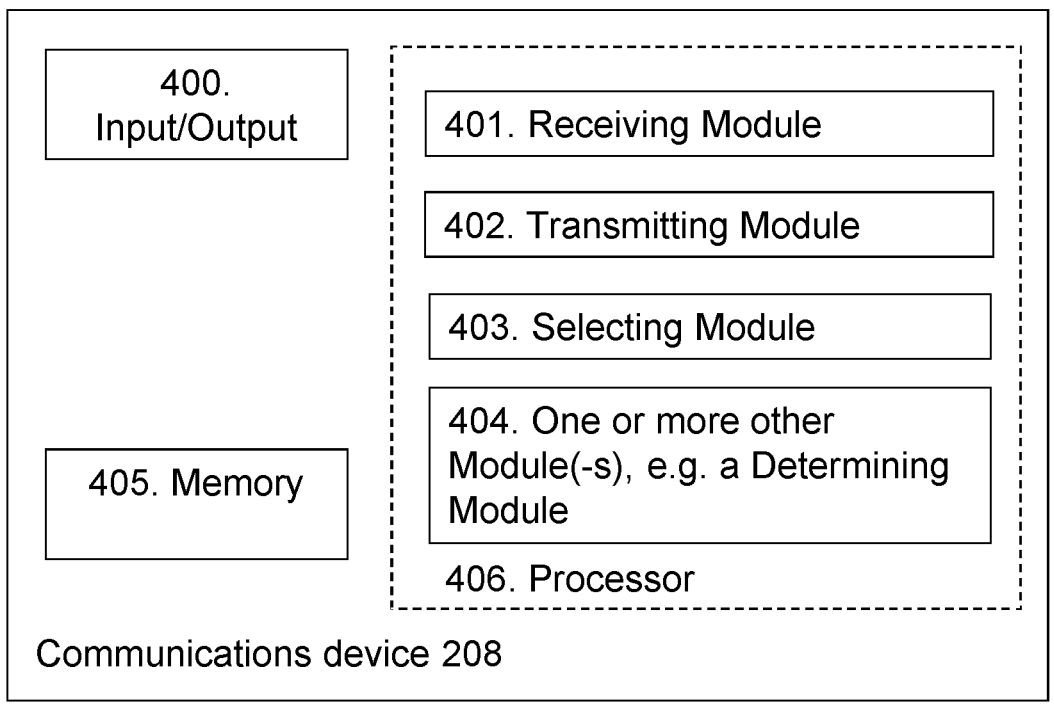
FIG. 4 is a schematic block diagram illustrating embodiments of a communications device.

More specifically the followings are communications device 208 related embodiments:

The communications device embodiments relate to example methods depicted in FIGS. 3A, 3B and an arrangement depicted in FIG. 4.

A method performed by the communications device 208 for transmission of a message, e.g. a msg 3 and possible data, in response to a received RAR message comprises one or more of the actions below. It should be understood that actions may be combined and/or that actions may be performed in any suitable order. As previously mentioned, the communications device 208 and the RNN 206 are operating in the wireless communications network 200.

Actions 301A, 300B

The communications device 208, receives, from the RNN 206, a RAR message comprising multiple grants, e.g. two or more grants, to a RA preamble, e.g. a RA transmitted from the communications device 208 to the RNN 206. The multiple grants may be associated with the same preamble identity (ID). In other words, the multiple grants may be associated to the same preamble ID.

In some embodiments, the RAR message comprising multiple grants associated to the same preamble identity comprises information about a subset of grants out of the multiple grants, which subset of grants is available for use in transmission of the message.

In some embodiments, the communications device 208 receives, from the RNN 206, information relating to one or more out of: a number of grants comprised in the subset of grants; and an aggregated number of bits of the subset of grants.

The communications device 208 may receive, from the RNN 206, the information by one or more out of: receiving the information via dedicated Radio Resource Control (RRC) signalling; receiving the information Layer 1/Layer 2 (L1/L2) control signalling using a Medium Access Control (MAC) Control Element (CE); and receiving the information via System Information Broadcast (SIB) signalling.

Actions 301A, 300B may be performed by a receiving module 401, comprised in the communications device 208. The receiving module 401 may be implemented by or arranged in communication with a processor 406 of the communications device 208. The processor 406 will be described in more detail below.

Action 301B

The communications device 208 may determine that the message to be transmitted requires one out of: resources provided by any one of the grants, resources provided by two or more grants out of the multiple grants, and more resources than provided by the multiple grants.

Actions 302A, 302B

When the message, e.g. the msg 3 and possible data, to be transmitted will fit in any one out of the multiple grants, the communications device 208 selects, e.g. randomly selects, one grant out of the multiple grants. By the expression "one grant out of the multiple grants" when used in this disclosure is meant "one grant among the multiple grants. Further, by the expression "message will fit in any of the grants" and similar when used in this disclosure is meant that the message requires resources, e.g. radio resources, allocated and/or provided by a single grant out of the multiple grants". In other words, the resources allocated and/or provided by each one of the multiple grants will be sufficient for transmission of the message and thus the communications device 208 may select, e.g. randomly select, one grant out of the multiple grants. This may also be expressed as the communications device 208 may select, e.g. randomly select, one grant among the multiple grants.

Action 302A, 302B may be performed by a selecting module 403 comprised in the communications device 208. The selecting module 403 may be implemented by or arranged in communication with the processor 406 of the communications device 208.

Actions 303A, 303B

When the message, e.g. the msg 3 and possible data, to be transmitted will fit in two or more grants out of the multiple grants, i.e. when the message to be transmitted requires resources provided by two or more grants out of the multiple grants, the communications device 208 selects the two or more of the grants out of the multiple grants. By the expression "message will fit in two or more grants out of the multiple grants" and similar when used in this disclosure is meant that the message requires resources, e.g. radio resources, allocated and/or provided by two or more grants out of the multiple grants". Thereby, all of the multiple grants or a subset of grants out of the multiple grants may be used.

Actions 303A,303B may be performed by the selecting module 403.

Actions 304A, 304B

When the message, e.g. the msg 3 and possible data, to be transmitted requires more resources, e.g. radio resources, than allocated and/or provided by the multiple grants, the communications device 208 selects, e.g. randomly selects, one grant out of the multiple grants. Thereby, decreasing the message collision probability.

Actions 304A,304B may be performed by the selecting module 403.

Actions 305A, 305B

The communications device 208 transmits, to the RNN 206, the message, e.g. the msg 3 and possible data, using the selected one grant out of the multiple grant or using the selected two or more grants out of the multiple grants. Thus, the communications device 208 transmits, to the RNN 206, the message using resources provided by the selected at least one grant out of the multiple grants.

Actions 305A, 305B may be performed by a transmitting module 402 comprised in the communications device 208. The transmitting module 402 may be implemented by or arranged in communication with the processor 406 of the communications device 208.

The communications device 208, may comprise an interface unit, e.g. an input/output interface 400, to facilitate communications between the network node and other network nodes or devices. The interface may, for example, include a transceiver configured to transmit and receive radio signals over an air interface in accordance with a suitable standard.

In some embodiments, the communications device 208, is configured to perform, by means of one or more other modules 404 configured to perform one or more further actions described herein. The one or more other modules may be implemented by or arranged in communication with the processor 406 of the communications device 208. For example, one other module may be a determining module 404 configured to determine whether or not the message will fit in any of the grants, whether or not the message will fit in resources allocated by two or more grants out of the multiple grants (e.g. whether or not the message requires resources allocated by two or more grants out of the multiple grants), and/or whether or not the message requires more resource than the resources allocated by the multiple grants, just to give some examples.

The communications device 208 may also comprise means for storing data. In some embodiments, the communications device 208 comprises a memory 405 configured to store the data. The data may be processed or non-processed data and/or information relating thereto. The memory 405 may comprise one or more memory units. Further, the memory 405 may be a computer data storage or a semiconductor memory such as a computer memory, a read-only memory, a volatile memory or a non-volatile memory. The memory is arranged to be used to store obtained information, data, configurations, and applications etc. to perform the methods herein when being executed in the network node.

Embodiments herein for transmission of a message, e.g. a msg 3 and possible data, in response to a received RAR may be implemented through one or more processors, such as the processor 406 in the arrangement depicted in FIG. 4, together with computer program code for performing the functions and/or method actions of embodiments herein. The program code mentioned above may also be provided as a computer program product, for instance in the form of a data carrier carrying computer program code for performing the embodiments herein when being loaded into the communications device 208. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the communications device 208.

Those skilled in the art will also appreciate that the input/output interface 400, the receiving module 401, the transmitting module 402, the selecting module 403, and the one or more other modules 404 above may refer to a combination of analogue and digital circuits, and/or one or more processors configured with software and/or firmware, e.g. stored in the memory 405, that when executed by the one or more processors such as the processors in the communications device 208 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Embodiments herein may also relate to a communication system including a host computer comprising a communications interface configured to receive user data originating from a transmission from a communications device, e.g. the communications device 208, to a RNN, e.g. the RNN 206. The communications device comprises a radio interface and processing circuitry. The communications device's processing circuitry is configured to:

- select, e.g. configured to randomly select, one grant out of the multiple grants when the message will fit in any of the grants;
- select two or more of the grants out of the multiple grants when the message will fit in the two or more grants out of the multiple grants, e.g. when the message requires resources provided by the two or more grants;
- select, e.g. configured to randomly select, one grant out of the multiple grants when the message requires more resources than provided by the multiple grants; and
- transmit, e.g. to the RNN 206, the message using the selected one grant out of the multiple grants or using the selected two or more grants out of the multiple grants.

The host computer may be embodied in the hardware and/or software of a standalone server, a cloud-implemented server, a distributed server or as a processing resource in a server farm. The host computer may be under the ownership or control of a service provider or on behalf of the service provider.

Some Exemplifying Embodiments

In this sections, some exemplifying embodiments will be described in more detail.

UE Behavior Upon Reception of Multiple Grants for msg3 Transmission in RAR

If multiple grants to the preamble id is received in the RAR message then the UE, e.g. the communications device 208, may perform one or more of the actions below.

a. If the UE's message transmission, e.g. the msg3 and possible data transmission, will fit in any of the grants, i.e. in any one grant out of the multiple grants,
  i. the UE randomly selects which grant to use. In other words, the UE randomly selects one grant out of the multiple grants in which the msg3 and the possible data will fit. This relates to Actions 302A and 302B previously described.
b. If the UE's message transmission, e.g. the msg3 and possible data transmission, will fit using all grants or some subset of the grants, i.e. in any two or more grants out of the multiple grants,
  i. the UE uses all grants or the subset of the grants that will fit the message, e.g. the msg3+possible data. This relates to Actions 303A and 303B previously described.
c. Otherwise, i.e. when more data is available for transmission than may be transmitted using all grants,
  i. the UE randomly selects one grant to use (to decrease the message collision probability, e.g. the msg3 collision probability). This relates to Actions 304A and 304B previously described.

Some Alternative Embodiments

In case (a.i) above, e.g. in case the message, such as the UE's msg3 and possible data, will fit in some of the grants (in case the grant sizes are different), the UE shall randomly select a grant among those that would fit the msg3 and the possible data. This may be the case, when the grants of the multiple grants have different size.

In case (b), the number of grants that may be used to form a subset may be configured. For example, in case the gNB, e.g. the RNN 206, issues n grants, a subset size of up to $k_1$ of these n grants may be used for the message, e.g. the msg3 and the possible data transmission. It may also be the aggregated size of the grants that may be configured, e.g. a subset of grants with an aggregated grant size of x bits may be used for the msg3 (+possible data).

In case several subsets of grants may be used which fulfil the configured requirement, a subset may be randomly selected.

In case b) up to k1 grants may be used, irrespective of whether or not the message msg3 and possible data will fit in the k1 grants.

In case c), "all grants" may be replaced by another subset of grants (different from case (b), e.g. so that if the msg3 (+possible data) does not fit in $k_2$ grants, only one randomly selected grant is used. Thus, in case c, if the message, e.g. the msg3 and possible data, does not fit in the k2 grants, only one grant may be used.

Signaling Options to Configure and Update the Algorithm Parameters n, $k_1$ and $k_2$ Several signaling options are available to configure and update the algorithm parameters. For example, in a signaling option 1, the NW, e.g. the communications network 200 by means of the RNN 206 or the CNN 204, configures the algorithm parameters via dedicated RRC signaling to the communications device 208.

The network, e.g. the communications network 200 by means of the RNN 206, may send, to the communications device 208, a message, e.g. a "RRC connection reconfiguration message" or a similar message, with the purpose to reconfigure parameters related to the UE actions. This is possible for communications devices 208, e.g. UEs, in an RRC inactive mode.

As another example, in a signaling option 2, the NW, e.g. the communications network 200 by means of the RNN 206 or the CNN 204, configures the algorithm parameters via other Layer 1/Layer 2 (L1/L2) control signaling to the communications device 208.

The network, e.g. the communications network 200 by means of the RNN 206 or the CNN 204, may send information to the communications device 208, e.g. a specific UE, by using an L2 signaling such as a MAC CE.

As yet another example, in a signaling option 3, System Information Broadcast (SIB) is used. The network, e.g. the communications network 200 by means of the RNN 206 or the CNN 204, may configure algorithm parameters via SIB signaling received by the communications device 208. In this case the configuration applies to all connected communications devices, e.g. UEs, in the cell or all idle/inactive UEs that are camping in the cell.

The signaling options 1-3 relate e.g. to the Actions 301A and 300B described above.

When the word "comprise" or "comprising" is used in this disclosure it shall be interpreted as non-limiting, i.e. meaning "consist at least of".

Modifications and other variants of the described embodiment(s) will come to mind to one skilled in the art having the benefit of teachings presented in the foregoing descriptions and the associated drawings. Therefore, it is to be understood that the embodiment(s) herein is/are not be limited to the specific examples disclosed and that modifications and other variants are intended to be included within the scope of this disclosure. Although specific terms may be employed herein, they are used in a generic and descriptive sense only and not for purposes of limitation.

The invention claimed is:

1. A method performed by a communications device configured to operate with a Radio Network Node (RNN) in a wireless communications network, the method comprising:
   receiving, from the RNN, a Random Access Response (RAR) message comprising multiple grants associated with a single preamble identity;
   determining that a message to be transmitted requires resources provided by any one of the multiple grants;
   selecting a particular one of the multiple grants when the message to be transmitted will fit in the any one of the multiple grants and if the message does not fit in the any one of the grants, selecting more than one grant out of the multiple grants; and
   transmitting, to the RNN, the message using resources provided by the selected grant.

2. The method of claim 1, wherein selecting a particular one of the multiple grants comprises randomly selecting one of the multiple grants.

3. The method of claim 1, wherein the RAR message comprises information about a subset, of the multiple grants, that is available for use in transmission of the message.

4. The method of claim 3, further comprising receiving, from the RNN, information relating to one or more of the following:
   a number of grants included in the subset of grants; and
   an aggregated number of bits included in the subset of grants.

5. The method of claim 4, wherein the information is received, from the RNN, via one or more of the following:
   dedicated Radio Resource Control (RRC) signalling;
   Layer 1/Layer 2 control signalling using a Medium Access Control (MAC) Control Element (CE); and
   System Information Broadcast (SIB) signalling.

6. A non-transitory, computer-readable medium storing computer-executable instructions that, when executed by at least one processor of a communications device, configure the communications device to perform operations corresponding to the method of claim 1.

7. The method of claim 1, further comprising:
   determining that the message to be transmitted requires resources provided by two or more of the multiple grants; and
   selecting a particular one of the multiple grants when the message to be transmitted will fit in the any one of the multiple grants.

8. The method of claim 1, further comprising:
   determining that a message to be transmitted requires more resources than provided by the multiple grants; and
   based on determining that the message to be transmitted requires more resources than provided by the multiple grants, selecting a particular one of the multiple grants.

9. A communications device configured to operate with a Radio Network Node (RNN) in a wireless communications network, wherein the communications device comprises:
   at least one processor; and
   computer-readable memory storing program code that, when executed by the at least one processor, configures the communications device to:
      receive, from the RNN, a Random Access Response (RAR) message comprising multiple grants associated with a single preamble identity;
      determine that a message to be transmitted requires resources provided by any one of the multiple grants;
      select a particular one of the multiple grants when the message to be transmitted will fit in the any one of the multiple grants and if the message does not fit in the any one of the grants, selecting more than one grant out of the multiple; and
      transmit, to the RNN, the message using resources provided by the selected grant.

10. The communications device of claim 9, wherein execution of the instructions configures the communications device to select a particular one of the multiple grants by randomly selecting one of the multiple grants.

11. The communications device of claim 9, wherein the RAR message comprises information about a subset, of the multiple grants, that is available for use in transmission of the message.

12. The communications device of claim 11, wherein execution of the instructions further configures the communications device to receive, from the RNN, information relating to one or more of the following:
   a number of grants included in the subset of grants; and
   an aggregated number of bits included in the subset of grants.

13. The communications device of claim 12, wherein execution of the instructions configures the communications device to receive, from the RNN, the information via one or more of the following:
   dedicated Radio Resource Control (RRC) signalling;
   Layer 1/Layer 2 control signalling using a Medium Access Control (MAC) Control Element (CE); and
   System Information Broadcast (SIB) signalling.

14. The communications device of claim 9, wherein the communication device is configured to:
   determine that the message to be transmitted requires resources provided by two or more of the multiple grants; and
   select a particular one of the multiple grants when the message to be transmitted will fit in the any one of the multiple grants.

15. The communications device of claim 9, wherein the communication device is configured to:
   determining that a message to be transmitted requires more resources than provided by the multiple grants; and
   based on determining that the message to be transmitted requires more resources than provided by the multiple grants, selecting a particular one of the multiple grants.

* * * * *